(No Model.)
L. D. ASHBROOK.
ELECTRIC BELT.
No. 437,079. Patented Sept. 23, 1890.
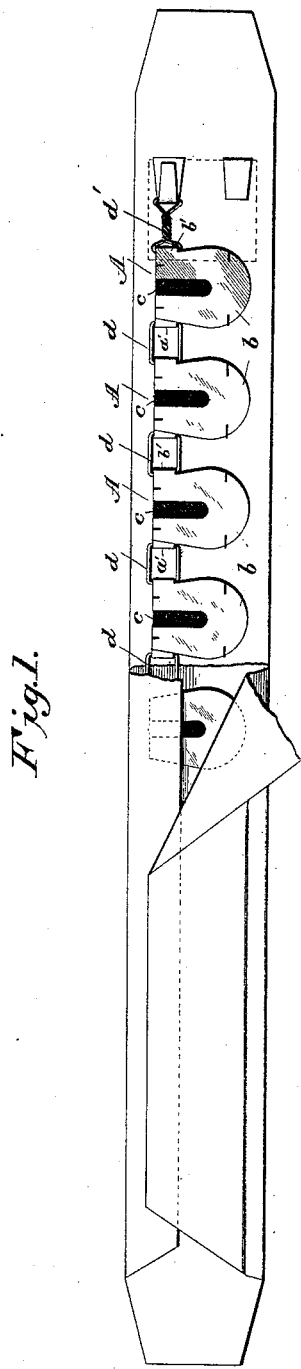
Fig. 1.
Fig. 2.
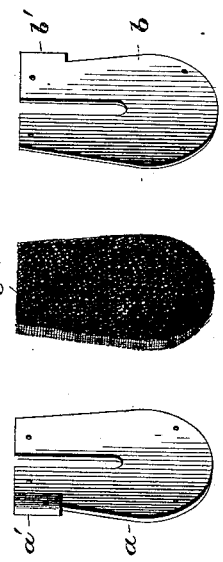
Fig. 3.
Witnesses
G. S. Elliott
E. W. Johnson
Lewis D. Ashbrook
Inventor
by 
Attorney

UNITED STATES PATENT OFFICE.

LEWIS D. ASHBROOK, OF CARDINGTON, OHIO.

ELECTRIC BELT.

SPECIFICATION forming part of Letters Patent No. 437,079, dated September 23, 1890.

Application filed May 15, 1890. Serial No. 351,924. (No model.)

*To all whom it may concern:*

Be it known that I, LEWIS D. ASHBROOK, a citizen of the United States of America, residing at Cardington, in the county of Morrow and State of Ohio, have invented certain new and useful Improvements in Electric Belts; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in electro-galvanic belts, the object being to provide a cheap, simple, and effective electric belt made up of a voltaic chain, the cells of which consist of U-shaped metallic plates with interposed absorbent pads, the upper portions of said plates being formed with projections which are adapted to be folded to form eyes for connecting by links the cells to each other and to the electrodes, the U-shaped plates being connected non-electrically, said connections also serving to hold the absorbent pads in place, as will be hereinafter fully set forth.

In the accompanying drawings, forming a part of this specification, Figure 1 is a side view of an electro-galvanic belt constructed in accordance with my invention. Fig. 2 is a sectional view, and Fig. 3 is a detail perspective view showing one of the cells disconnected.

The voltaic chain is made up of a series of cells, which are connected to each other and to the electrodes by links, the whole being adapted to be inclosed within a covering of suitable waterproof material, and said chain is adapted to be readily disconnected from the electrodes when it is desired to moisten the pads.

The cells A are made up of two metallic plates $a$ and $b$, between which is located an absorbent pad $c$, preferably of felt. The plates $a$ and $b$ are U-shaped, and are provided near their upper ends with integral tongues $a'$ and $b'$, which are adapted to be folded or doubled upon the inner sides of the plate to form eyes $a^2$ and $b^2$, into which links $d$ can be passed for connecting the cells to each other. The terminal cells are connected by a link $d'$ to the electrodes, which pass through to the inner side of the belt to contact with the body of the wearer. The plates $a$ and $b$ are of copper and zinc, and the zinc plates are stamped up or cut from material of greater thickness than the copper plate, thereby providing for the greater consumption of the zinc plate, as when both plates are of the same thickness the zinc plate gives out much quicker than the copper plate. Both of the plates $a$ and $b$ are correspondingly perforated, and between the same is placed a pad having the same outward configuration as said metallic plates. The plates and interposed pad which form a cell are united by stitches. The links are made up of conducting material, and are alternately connected to the zinc and copper plates.

By the construction described the active qualities of the elements may be maintained for a longer period than what would be the case were no central portion removed, since a portion of the absorbent pad is not directly subject to the action of the elements, but simply holds the liquid and feeds it by capillary attraction to those portions of the pad immediately between the plates. Of course the external covering prevents the undue evaporation of the liquid from the exposed portions of the pads.

I am aware that prior to my invention electro-galvanic belts made up of a series of cells of copper and zinc plates with an interposed absorbent pad have been connected to each other by links, each of the plates having tongues formed thereon, bent to form eyes with which the links engage, the plates being connected together by suitable fastenings which pass through the absorbent pads and the plates, and I do not therefore claim such construction as my invention; but, What I do claim as new, and desire to secure by Letters Patent, is—

1. In an electro-galvanic belt, a cell consisting of two metallic U-shaped plates presenting terminals having integral tongues folded to form eyes, and means for connecting the plates and absorbent pads together, substantially as set forth.

2. In an electro-galvanic belt, a cell consisting of two metallic U-shaped plates, each having a bent or folded tongue, an absorbent pad interposed between said plates, and transverse fastenings passing through apertures in said plates for holding the parts of each cell together, and links for connecting the cells to each other, substantially as set forth.

3. In an electro-galvanic belt, a U-shaped copper plate connected to the zinc plate of the adjacent cell by a link, a correspondingly-shaped zinc plate of greater thickness than the copper plate connected by a link to the copper plate of the adjacent cell, the metallic plates of each cell being separated by an absorbent pad, and means for non-electrically connecting the zinc and copper plates and absorbent pad together, substantially as set forth.

In testimony whereof I affix my signature in presence of two witnesses.

LEWIS D. ASHBROOK.

Witnesses:
E. W. JOHNSON,
WILLIAM PAXTON.